United States Patent
Ayorinde (12)

(10) Patent No.: US 6,444,071 B1
(45) Date of Patent: Sep. 3, 2002

(54) METHOD OF FABRICATING A REMOVABLE MANDREL FOR FILAMENT WINDING CONTAINERS

(75) Inventor: A. John Ayorinde, Lincoln, NE (US)

(73) Assignee: Shade, Inc., Lincoln, NE (US)

( * ) Notice: Subject to any disclaimer, the term of this patent is extended or adjusted under 35 U.S.C. 154(b) by 121 days.

(21) Appl. No.: 09/654,985

(22) Filed: Sep. 5, 2000

(51) Int. Cl.[7] ................................................ B65H 81/00
(52) U.S. Cl. ........................ 156/155; 156/173; 156/175; 264/221; 264/317
(58) Field of Search ................................. 156/155, 156, 156/173, 175, 169, 285; 264/219, 221, 313, 317

(56) References Cited

U.S. PATENT DOCUMENTS

| | | | | |
|---|---|---|---|---|
| 4,126,659 A | * | 11/1978 | Blad ............................ | 264/314 |
| 4,155,970 A | * | 5/1979 | Cassell ........................ | 264/317 |
| 4,525,228 A | * | 6/1985 | Bowen ......................... | 156/155 |
| 5,057,174 A | * | 10/1991 | Anderson et al. ............ | 156/155 |
| 5,192,384 A | * | 3/1993 | Barrier et al. ............... | 264/314 |
| 5,266,137 A | * | 11/1993 | Hollingsworth ............. | 156/156 |
| 5,460,675 A | * | 10/1995 | Moser ......................... | 156/155 |

\* cited by examiner

*Primary Examiner*—Jeff H. Aftergut
(74) *Attorney, Agent, or Firm*—John R. Hoffman

(57) ABSTRACT

A method of fabricating a removable mandrel for use in filament winding a container, includes the steps of providing and inflating an internal bladder. A dry 3-D fabric layer of a given thickness is layed-up about the inflated bladder. An external vacuum/pressure bag is installed about the dry fabric layer. The dry 3-D fabric layer is impregnated with a liquid soluble resin between the internal bladder and the external bag. The resin then is cured to rigidify the fabric layer to form a mandrel structure. The container then can be wound on the mandrel formed by the cured and rigidified fabric layer, and the resin can be subsequently washed out to remove the fabric layer.

30 Claims, 4 Drawing Sheets

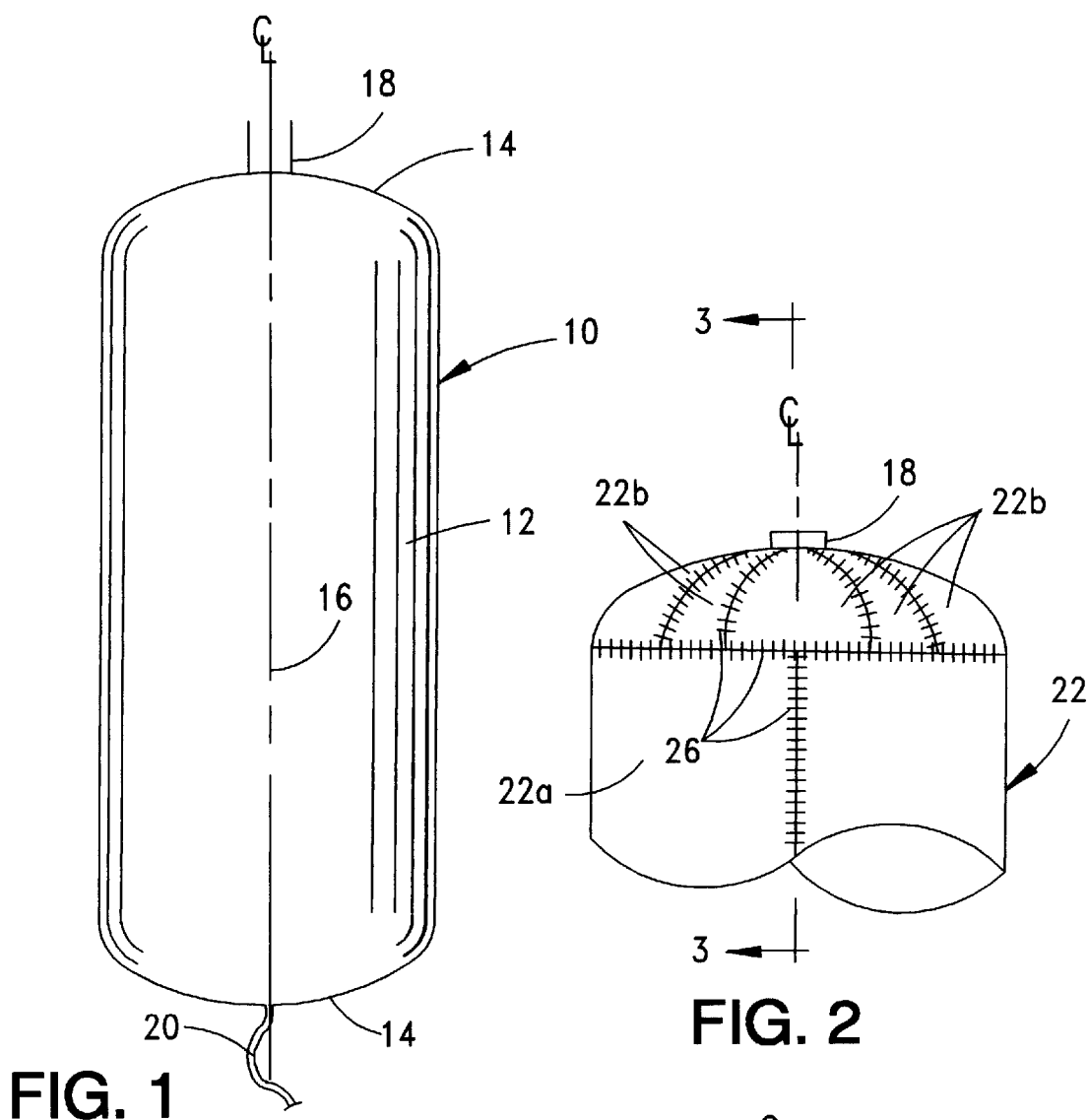
FIG. 1
FIG. 2
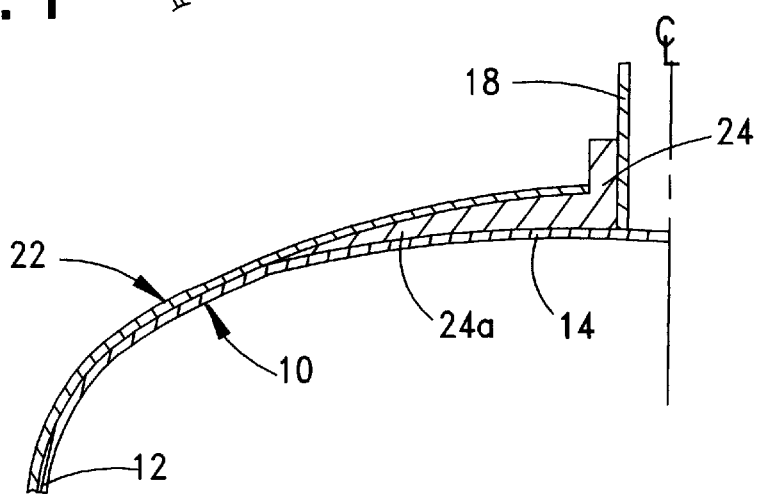
FIG. 3

METHOD OF FABRICATING A REMOVABLE MANDREL FOR FILAMENT WINDING CONTAINERS

FIELD OF THE INVENTION

This invention generally relates to the art of filament winding composite structures and, particularly, to a method of fabricating a removable mandrel for use in filament winding containers, such as pressure vessels, chemical or water storage tanks, rocket motor cases or any tubular structure which may or may not be closed. Tubular structures may be cylindrical, rectangular, triangular, ellipsoidal, square or other polygonal shapes. Such containers or tubular structures are filament wound on mandrels.

BACKGROUND OF THE INVENTION

Various types of vessels, such as pressure vessels, rocket casings, and other tubular structures and the like, are fabricated with wall structures of filament wound composite materials. In other words, the thickness of the walls is built up by winding filaments associated with an appropriate resin, whereafter the assembly is cured to form what is called a "filament composite structure". The filaments may be of glass, graphite or like material. The thickness of the structural walls are built up by winding hoop or helical layers in a desired pattern. In some instances, an impermeable liner or bladder may be used inside the filament composite structure. In some instance, a core or foam layer or thickness may be sandwiched between filament wound layers. A structural inner skin or layer a structural outer skin or layer may be separated by a hollow space that may be vacuumed to reduce heat transfer between the inner and outer skins. The core may be made of lightweight material such as a honeycomb core, closed foam, balsa wood or the like. Various fittings, such as a polar boss at a closed end of the vessel, may be integrated in the composite structure and held in place by the filament windings. A manway may be installed along the cylindrical surface of the structure with no openings at the domes except discharging faucets and the like.

Filament wound vessels of the character described above structure on a mandrel. However, the invention equally applies to hand layed-up vessels or the like. The mandrel and the resulting filament wound vessel typically has one or more dome-shaped closed ends. For instance, a filament wound vessel may have a generally cylindrical portion extending a major length of the vessel corresponding to a cylindrical mandrel about which the vessel is wound. The ends of the mandrel are generally ellipsoidal to form opposite dome-shaped closed ends which may or may not have various fittings, such as polar bosses. The cylindrical portion of the vessel is formed by hoop and longitudinal filament windings. The longitudinal windings may be wound using either helical or polar patterns and extend into the domes at each end of the cylindrical section. After the filament composite structure of the vessel is built-up on the mandrel, the entire assembly is cured and the vessel is removed from the mandrel.

Problems continue to plague fabrication processes as described above, particularly in removing the mandrel or mandrel tooling. Segmented metal mandrels have been used with some success. A segmented mandrel is broken down and removed through an opening in the vessel (i.e., from the inside-out). Unfortunately, segmented mandrels are extremely expensive, very labor intensive and sacrifice tolerance repeatability. Water soluble sand mandrels have been effective for large pressure vessels and rocket motor casings, but the binder in the sand is limited to low temperature cures. In addition, dimensional repeatability of sand surfaces can be a variable or requires extremely expensive tooling.

The present invention is directed to solving this myriad of problems by a simple fabrication process which affords easy removal of the mandrel used in fabricating filament wound containers. It should be understood herein that the term "container" is intended to include closed vessels such as pressure vessels and the like, enumerated above, as well as any tubular or spherical structures which in one way or another "contains" a medium within the confines thereof, whether the container be closed or not.

SUMMARY OF THE INVENTION

An object, therefore, of the invention is to provide a new and improved method of fabricating a removable mandrel for use in filament winding a container.

In the exemplary embodiment of the invention, the method includes the steps of providing and inflating an internal bladder. A dry three-dimensional (3-D) fabric layer of a given thickness is layed-up about the inflated bladder. An external vacuum/pressure bag is installed about the fabric layer. The dry fabric layer then is impregnated with a liquid soluble resin between the internal bladder and the external bag. The resin is cured to rigidify the 3-D fabric layer to form a mandrel structure. A container then can be wound on the mandrel formed by the cured and rigidified fabric layer, and the resin subsequently is washed out to remove the fabric.

As disclosed herein, the internal bladder is deflated and removed from inside the mandrel before the mandrel is used to filament wind the container. The bladder is provided with an elongated cylindrical configuration having opposite hemispherical ends. The bladder is inflated through a pressure port at one end thereof.

The dry 3-D fabric layer is layed-up as a thickness of woven fabric, such as of glass fibers. The dry 3-D fabric layer is layed-up in sections to form a desired configuration of the container. For instance, like the bladder, the sections of the dry 3-D fabric layer may be layed-up to form an elongated cylindrical configuration with opposite hemispherical ends.

According to one aspect of the invention, the dry 3-D fabric layer is impregnated by the resin under pressure applied between the internal bladder and the external bag. According to a preferred embodiment of the invention, the dry 3-D fabric layer is impregnated by applying alternating pressure and vacuum between the internal bladder and the external bag. The alternating pressure and vacuum are applied at spaced locations of the bladder and bag. For instance, with the elongated configuration, the alternating pressure and vacuum may be applied at the opposite hemispherical ends of the pressure/vacuum bag.

Preferably, the resin is water soluble so that, after curing, the resin can be dissolved and washed away. The 3-D fabric then can be removed, dried and reused as a subsequent mandrel.

Other features of the invention include the step of applying a release film to the outside of the internal bladder before the dry fabric layer is layed-up thereabout. This facilitates removal of the internal bladder after the mandrel is formed. The external vacuum/pressure bag is removed before a container is filament wound about the mandrel.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a side elevational view of an inflatable internal bladder used in an initial step in the method of the invention;

FIG. 2 is a fragmented elevational view of one end of the dry 3-D fabric layer as having been layed-up in sections;

FIG. 3 is a fragmented vertical section taken generally along line 3—3 of FIG. 2, but only on one side of the center-line;

DETAILED DESCRIPTION OF THE PREFERRED EMBODIMENT

Figure 4:
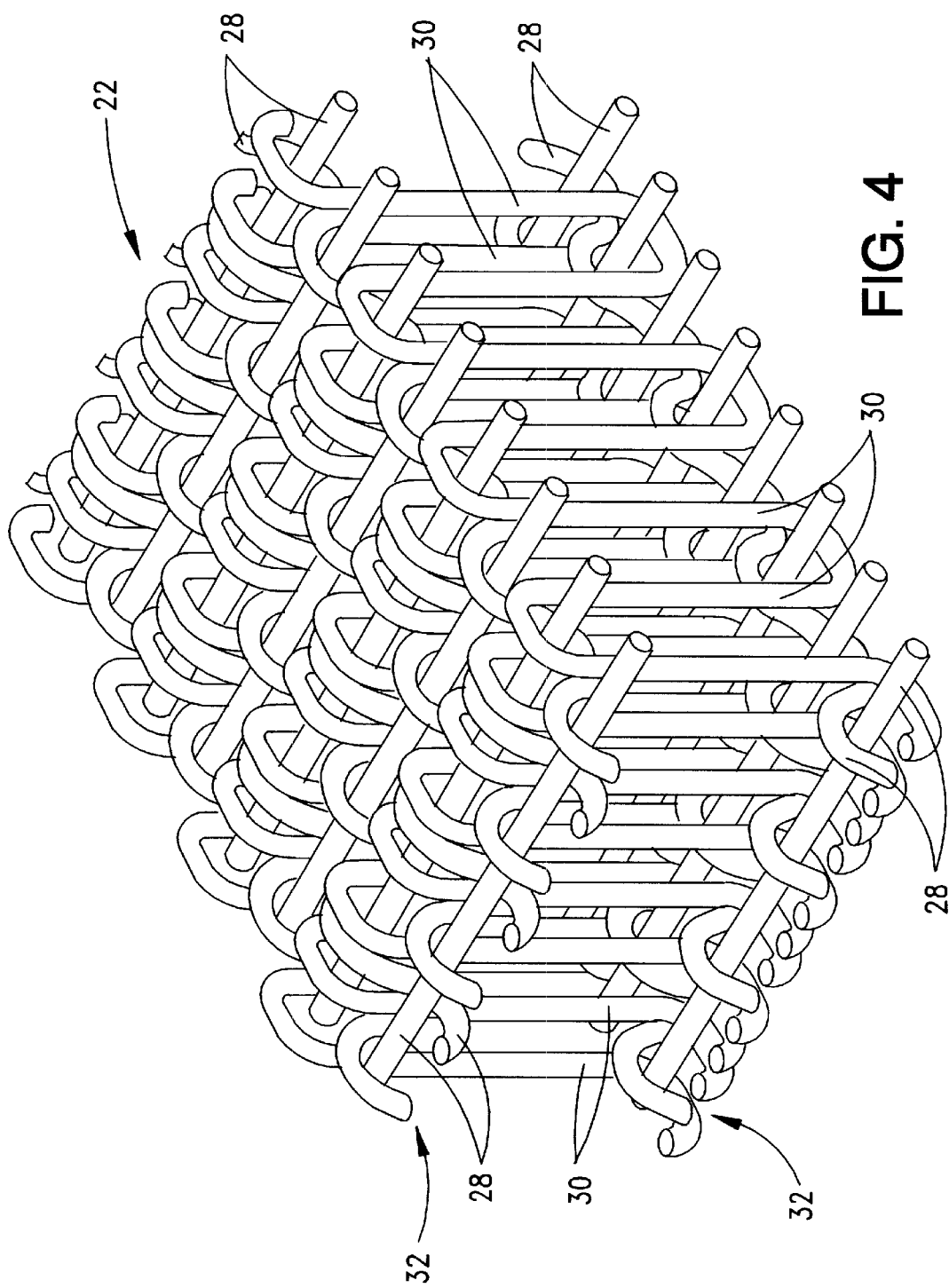
FIG. 4 is a perspective view of a portion of the three-dimensional fabric layer layed-up about the inflated bladder.

Referring to the drawings in greater detail, the method of the invention herein is directed to fabricating a removable mandrel for use in filament winding a container. Referring first to FIG. 1, the first step in the method of the invention is to provide an inflatable elastomeric bladder, generally designated 10, which serves as a temporary mandrel for laying-up and curing a composite mandrel thereon. The bladder may be of rubber material and be of various configurations. As shown in FIG. 1, the bladder is inflated in the form of an elongated container having a central cylindrical portion 12 and a pair of opposite domes or hemispherical ends 14. The elongated bladder defines a center-line 16. An appropriate support mechanism 18 is shown in phantom at one end of the bladder, and a pressure port 20 is shown at the other end of the bladder for inflating the bladder. Preferably, a release agent or film should be applied about the exterior of the bladder to prevent the bladder from bonding to the mandrel as described below.

FIGS. 2 and 3 show the next step in the method of the invention which involves the laying-up of a dry three-dimensional (3-D) fabric layer, generally designated 22, about inflated bladder 10. If required, a polar boss 24 (FIG. 3) may be installed about support mechanism 18, with a flange portion 24a about the boss extending between bladder 10 and fabric layer 22. The dry 3-D fabric layer is layed-up about the bladder to precisely conform to the elongated configuration of the bladder. Therefore, as seen in FIG. 2, a cylindrical section 22a of the dry 3-D fabric layer is wrapped about cylindrical portion 12 (FIG. 1) of the bladder. A plurality of somewhat pie-shaped dome sections 22b of the dry fabric layer are combined to cover the hemispherical ends 14 of the bladder. Fabric sections 22a and 22b are joined by appropriate stitching 26.

Figure 5:
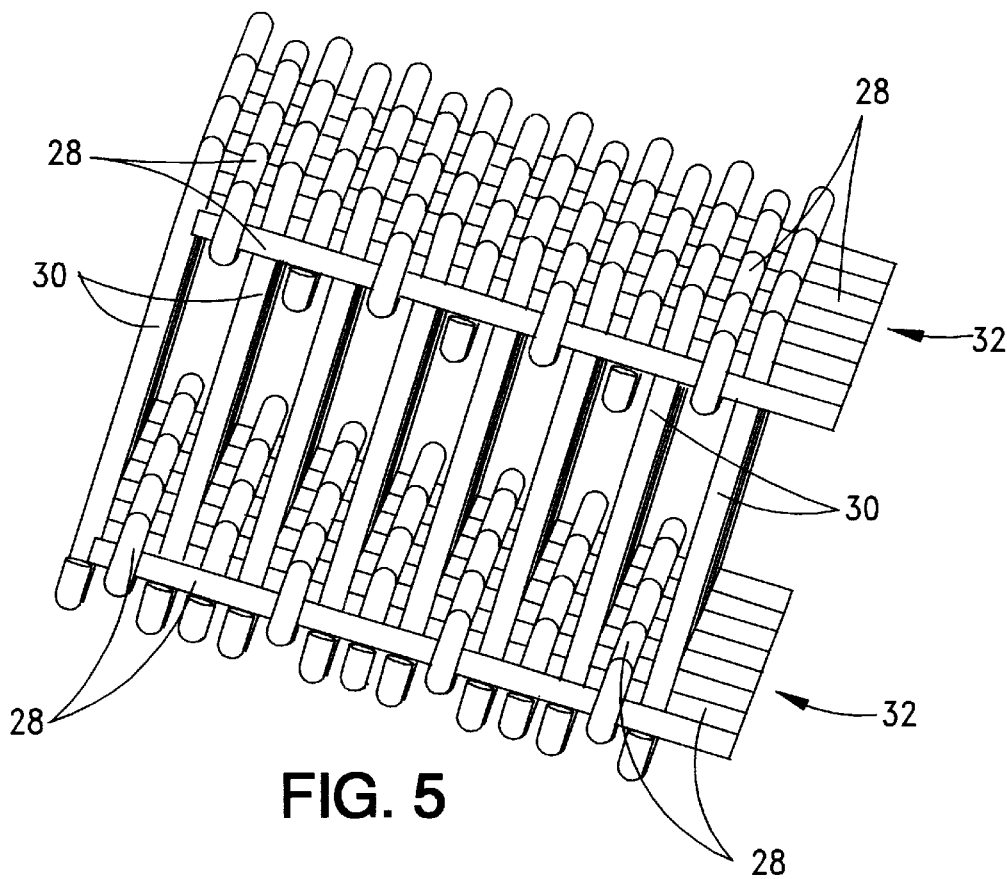
FIG. 5 is a plan view of a portion of the three-dimensional fabric in a warp direction.

Referring to FIGS. 4 and 5 in conjunction with FIGS. 2 and 3, dry fabric layer 22 is a three-dimensional (3-D) fabric structure. In other words, the fabric consists of bi-directionally woven fibers 28 which are vertically tied together with vertical woven fibers 30. In essence, fibers 28 form two plies, generally designated 32, which have a preset spacing therebetween in a beam structure defined by vertical fibers 30. The resultant structure is a 3-D structure with two dimensions horizontally for each ply 32 and a third dimension forming a thickness of the structure defined by woven fibers 30. This 3-D structure is capable of accepting and holding a bonding resin. In essence, woven vertical fibers 30 maintain a given thickness for the fabric which is different from conventional, single ply woven fabric. The resultant fabric is sort of a stitched mat capable of holding a substantial amount of resin. The fabric has strength in three directions. The fibers, themselves, may be of fiberglass, Kevlar or the like.

Figure 6:
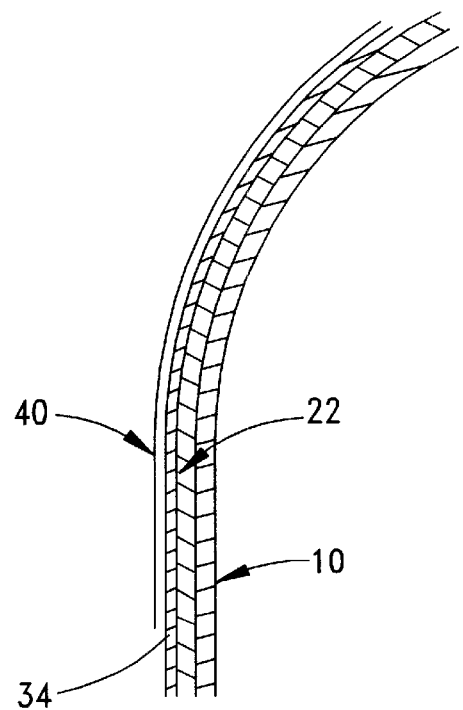
FIG. 6 is a fragmented section through the assembly after the external pressure-vacuum bag has been installed.

Referring to FIG. 6, a bleeder cloth 34 may be applied about dry 3-D fabric layer 22. It has been found difficult, if possible, to introduce the precise amount of resin necessary for completely impregnating dry fabric layer 22. Therefore, it is easier to over-impregnate the fabric and to use bleeder cloth or layer 34 to absorb any excess resin.

Still referring to FIG. 6, the next step in the method of the invention is to install an external vacuum/pressure bag, generally designated 40, about the entire assembly so that dry 3-D fabric layer 22 is sandwiched between the internal inflated bladder 10 and the external pressure/vacuum bag 40. The pressure/vacuum bag should be liquid impervious and may be fabricated of such material as Mylar or like material. The external bag should be capable of carrying both internal pressure and vacuum inter-changeably.

Figure 7:
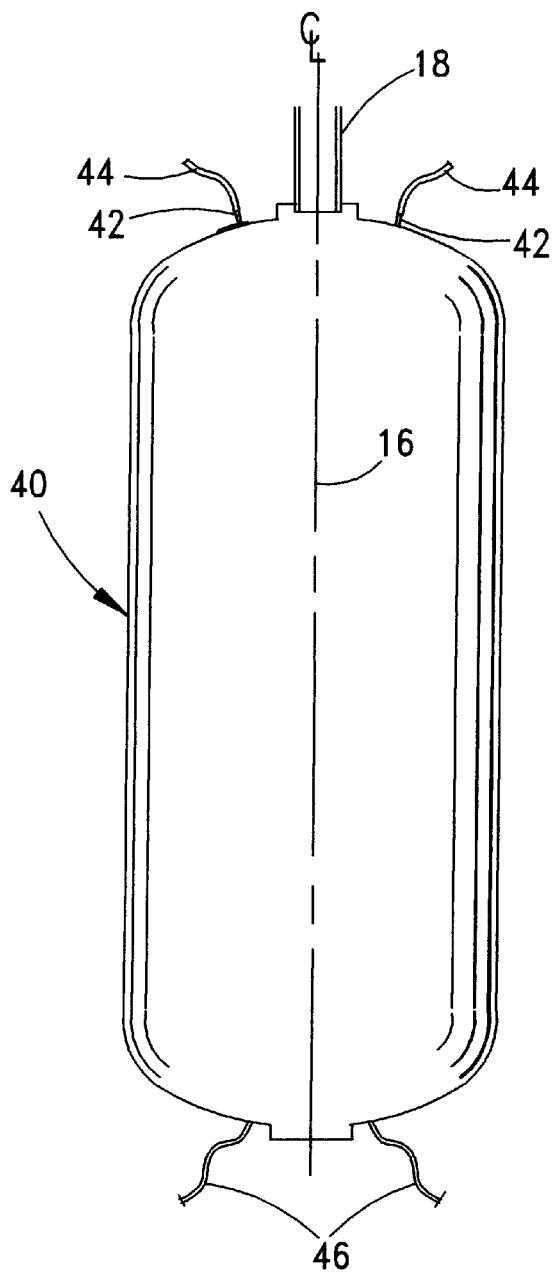
FIG. 7 is an elevational view of the assembly with the external pressure-vacuum bag installed and showing the location of a plurality of pressure ports and vacuum ports.

FIG. 7 shows that external pressure/vacuum bag 40 has a pair of fittings 42 connected to a pair of supply lines 44 at one end of the bag, and a pair of lines or ports 46 at an opposite end of the bag. The next step in the method of the invention is to introduce a liquid soluble resin under pressure to impregnate dry 3-D fabric layer 22 between internal bladder 10 and external bag 40. The resin is introduced under pressure through supply lines 44 and fittings 42 at one end of the bag. Simultaneously, vacuum may be applied through ports 46 at the opposite end of the bag. According to a preferred embodiment of the invention, pressure and vacuum are alternatingly applied to assist in removing entrapped air from within the space between internal bladder 10 and external bag 40, i.e., from within the dry 3-D fabric layer 22.

The next step in the method of the invention is to cure the resin impregnated fabric layer 22. This typically is performed by heating the structure in an oven at an appropriate curing temperature.

After fabric layer 22 is cured, internal bladder 10 is deflated and removed, such as through support mechanism 18. Bleeder cloth or layer 34 and external pressure/vacuum bag 40 also are removed from the outside of fabric layer 22 which now is a self-supporting or stand-alone mandrel fabricated according to the concepts of the invention.

Figure 8:
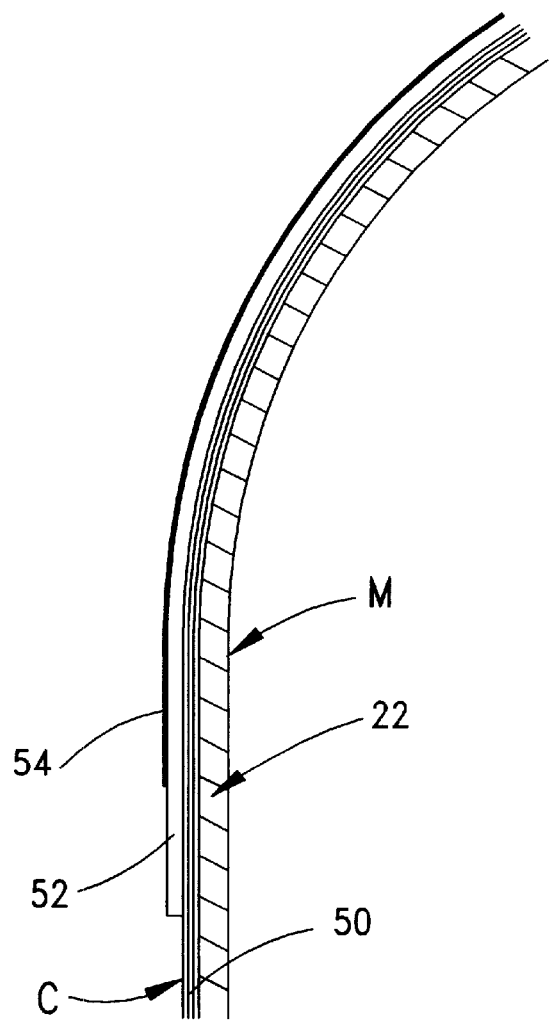
FIG. 8 is a view similar to that of FIG. 6, but with the internal bladder, bleeder cloth and external pressure/vacuum bag removed, and with a container having been filament wound onto the mandrel formed by the method of the invention.

FIG. 8 shows dry 3-D fabric layer 22 which has been impregnated with the liquid soluble resin and cured so that the fabric layer now constitutes a rigidified stand-alone mandrel "M". Whereas internal bladder 10 acted as a temporary mandrel for fabricating mandrel "M", the mandrel formed with the 3-D fabric layer now is used to filament wind a container "C" formed as a thickness of filament composite material 22. Like mandrel "M", a bleeder cloth layer 52 and an external pressure/vacuum bag 54 can be used to impregnate filament composite 50 with an appropriate resin, whereafter the filament composite material is cured to form an appropriate container "C".

Finally, after container "C" (FIG. 8) is cured, bleeder cloth layer 52 and pressure/vacuum bag 54 are removed therefrom. The liquid soluble resin in mandrel "M" fabricated according to the invention now can be washed out of fabric layer 22. For instance, the resin may be a water soluble resin and be dissolved and washed away by flushing the interior of container "C" which was fabricated with a resin that is not soluble by the water. After the dissolved resin is washed away, fabric layer 22 is removed from within the container, and the fabric layer can be dried for reuse in fabricating a mandrel for subsequently winding another filament composite container.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of fabricating a removable mandrel for use in filament winding a container, comprising the steps of:
   providing and inflating an internal bladder;
   laying-up a dry 3-D fabric layer of a given thickness about the inflated bladder;
   installing an external vacuum/pressure bag about said dry fabric layer;
   impregnating the dry 3-D fabric layer with a liquid soluble resin between the internal bladder and the external bag; and
   curing said resin to rigidify the fabric layer to form a mandrel structure,
      whereby the container can be wound on the mandrel formed by the cured and rigidified fabric layer and the resin subsequently washed out to remove the fabric layer.

2. The method of claim 1 wherein said internal bladder is deflated and removed from inside the mandrel before the mandrel is used to filament wind the container.

3. The method of claim 1 wherein said bladder is provided with an elongated cylindrical configuration having opposite hemispherical ends.

4. The method of claim 3 wherein said bladder is inflated through at least one of said ends.

5. The method of claim 1 wherein said dry 3-D fabric layer is layed-up as a thickness of woven fabric.

6. The method of claim 5 wherein said woven fabric is of glass fibers.

7. The method of claim 1 wherein said dry 3-D fabric layer is layed-up in sections to form a desired configuration of the container.

8. The method of claim 7 wherein said sections of the dry 3-D fabric layer are layed-up to form an elongated cylindrical configuration with opposite hemispherical ends.

9. The method of claim 1, including the step of applying a release film to the outside of the internal bladder before the dry 3-D fabric layer is layed-up thereabout.

10. The method of claim 1 wherein said dry 3-D fabric layer is impregnated by said resin under pressure applied between the internal bladder and the external bag.

11. The method of claim 1 wherein said dry 3-D fabric layer is impregnated by said resin at least in part by the use of a vacuum applied between the internal bladder and the external bag.

12. The method of claim 1 wherein said dry 3-D fabric layer is impregnated by said resin by applying alternating pressure and vacuum between the internal bladder and the external bag.

13. The method of claim 12 wherein said alternating pressure and vacuum are applied at spaced locations of the bladder and bag.

14. A method of fabricating a removable mandrel for use in filament winding a container, comprising the steps of:
   providing and inflating an internal bladder having an elongated cylindrical configuration with opposite hemispherical ends;
   laying-up a dry 3-D fabric layer of a given thickness about the inflated bladder, the dry 3-D fabric layer being formed as a thickness of woven fabric layed-up in sections to form a desired configuration of the container;
   installing an external vacuum/pressure bag about said dry 3-D fabric layer;
   impregnating the dry 3-D fabric layer with a liquid soluble resin under pressure between the internal bladder and the external bag; and
   curing said resin to rigidify the fabric layer to form a mandrel structure,
      whereby the container can be wound on the mandrel formed by the cured and rigidified fabric layer and the resin subsequently washed out to remove the fabric layer.

15. The method of claim 14 wherein said internal bladder is deflated and removed from inside the mandrel before the mandrel is used to filament wind the container.

16. The method of claim 14 wherein said bladder is inflated through at least one of said ends.

17. The method of claim 14 wherein said woven fabric is of glass fibers.

18. The method of claim 14, including the step of applying a release film to the outside of the internal bladder before the dry 3-D fabric layer is layed-up thereabout.

19. The method of claim 14 wherein said dry 3-D fabric layer is impregnated by said resin by applying alternating pressure and vacuum between the internal bladder and the external bag.

20. The method of claim 19 wherein said alternating pressure and vacuum are applied at opposite ends of the bladder and bag.

21. A method of fabricating a filament wound container about a removable mandrel, comprising the steps of:
   providing and inflating an internal bladder;
   laying-up a dry 3-D fabric layer of a given thickness about the inflated bladder;
   installing an external vacuum/pressure bag about said dry 3-D fabric layer;
   impregnating the dry fabric layer with a liquid soluble resin between the internal bladder and the external bag;
   curing said resin to rigidify the fabric layer to form a mandrel structure,
   filament winding a container about the mandrel formed by the cured and rigidified fabric layer;
   washing out the resin from said fabric layer; and
   removing the fabric layer from within the container.

22. The method of claim 21 wherein the removed 3-D fabric layer is dried for subsequently reuse.

23. The method of claim 21 wherein said internal bladder is deflated and removed from inside the mandrel before the mandrel is used to filament wind the container.

24. The method of claim 21 wherein said dry fabric layer is layed-up as a thickness of woven fabric.

25. The method of claim 21 wherein said dry 3-D fabric layer is layed-up in sections to form a desired configuration of the container.

26. The method of claim 21, including the step of applying a release film to the outside of the internal bladder before the dry fabric layer is layed-up thereabout.

27. The method of claim 21 wherein said dry 3-D fabric layer is impregnated by said resin under pressure applied between the internal bladder and the external bag.

28. The method of claim 21 wherein said dry 3-D fabric layer is impregnated by said resin at least in part by the use of a vacuum applied between the internal bladder and the external bag.

29. The method of claim 21 wherein said dry 3-D fabric layer is impregnated by said resin by applying alternating pressure and vacuum between the internal bladder and the external bag.

30. The method of claim 29 wherein said alternating pressure and vacuum are applied at spaced locations of the bladder and bag.

* * * * *